United States Patent [19]

Heyderman et al.

[11] Patent Number: 5,088,602
[45] Date of Patent: Feb. 18, 1992

[54] BOOK-LIKE STORAGE CONTAINER FOR A VIDEOCASSETTE OR THE LIKE

[76] Inventors: Mark B. Heyderman, 4 Erie Ct., Miller Place, N.Y. 11764; Melvyn M. Sloves, 18 Balmoral Dr., Chestnut Ridge, N.Y. 10977

[21] Appl. No.: 651,994

[22] Filed: Feb. 7, 1991

[51] Int. Cl.$^5$ .................... B65D 85/672; B65D 15/50
[52] U.S. Cl. ................... 206/387; 206/45.21; 206/45.23; 206/804; 206/818; 206/472
[58] Field of Search ............... 206/387, 804, 818, 472, 206/473, 45.2, 45.21, 45.23, 45.25; 220/337, 339

[56] References Cited

U.S. PATENT DOCUMENTS

| | | | |
|---|---|---|---|
| 873,473 | 12/1907 | Walsh . | |
| 1,709,685 | 4/1929 | Rothrock | 206/472 |
| 2,248,843 | 7/1941 | Atwood | 206/804 |
| 2,341,600 | 2/1944 | Daniel | 206/52 |
| 3,315,718 | 4/1967 | Berman | 220/339 |
| 3,593,845 | 7/1971 | Schwartz | 206/387 |
| 3,749,301 | 7/1973 | Peckar | 206/818 |
| 3,829,132 | 8/1974 | Willieme | 281/31 |
| 3,998,324 | 12/1976 | Roccaforte | 206/387 |
| 4,235,334 | 11/1980 | Ahn | 206/387 |
| 4,407,410 | 10/1983 | Graetz et al. | 206/387 |
| 4,467,920 | 8/1984 | Smith | 206/457 |
| 4,651,872 | 3/1987 | Joyce | 206/45.2 |
| 4,717,021 | 1/1988 | Ditzig | 206/387 |
| 4,724,957 | 2/1988 | Burgschweiger | 206/309 |
| 4,765,466 | 8/1988 | Ivey | 206/232 |
| 4,778,051 | 10/1988 | Schaub et al. | 206/387 |
| 4,789,058 | 12/1988 | Blaney | 206/232 |
| 4,925,027 | 5/1990 | Roze | 206/387 |

FOREIGN PATENT DOCUMENTS

3151649 3/1983 Fed. Rep. of Germany ...... 206/387
2030545 4/1980 United Kingdom ............... 206/387

Primary Examiner—Paul T. Sewell
Assistant Examiner—Marie D. Patterson
Attorney, Agent, or Firm—Shlesinger, Arkwright & Garvey

[57] ABSTRACT

A book-like storage container includes a receptacle for removably receiving a videocassette or the like therein and includes top, bottom, left, right, and rear walls, each of which has surface dimensions. The receptacle includes a front opening. A panel assembly includes a first panel foldably connected to the bottom wall by a first hinge, a second panel foldably connected to the first panel by a second hinge, and a third panel foldably connected to the second panel by a third hinge. Each of the first, second and third panels has a first open position and a second closed position, and includes inside surface dimensions. The inside surface dimension of the first panel is substantially equal to the front opening. The inside surface dimension of the second panel is substantially equal to the surface dimension of the top wall, and the inside surface dimension of the third panel is substantially equal to the surface dimension of the rear wall. Each of the third panel and the rear wall has affixed thereto individual cooperating securement members. When the first, second and third panels are folded about their respective first, second and third hinges, for assuming the closed position, the first panel abuts and substantially closes the front opening, the second panel substantially overlies the top wall, and the third panel substantially overlies the rear wall so that the individual securement members are releasably locked for thereby securing the article in the receptacle.

14 Claims, 5 Drawing Sheets

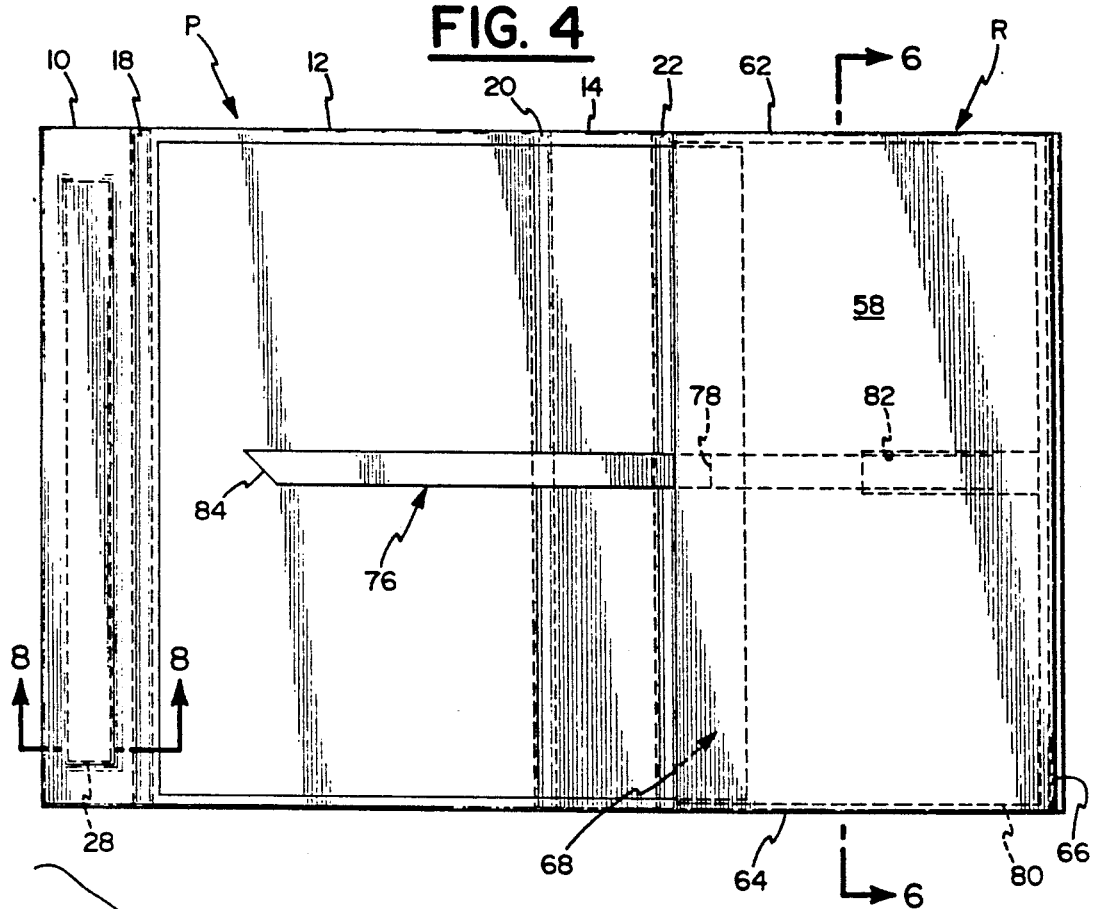
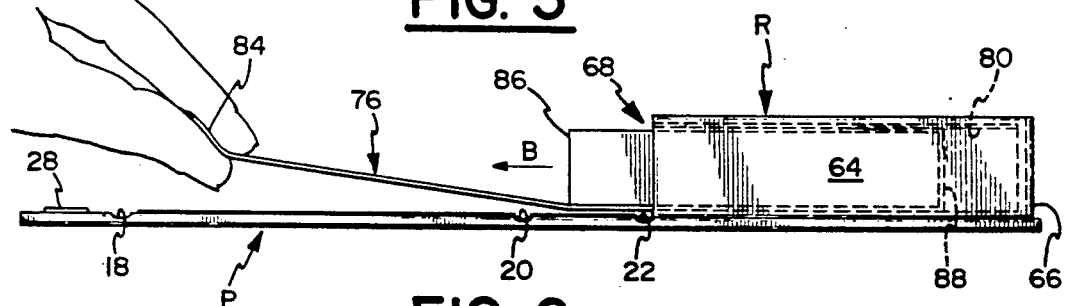
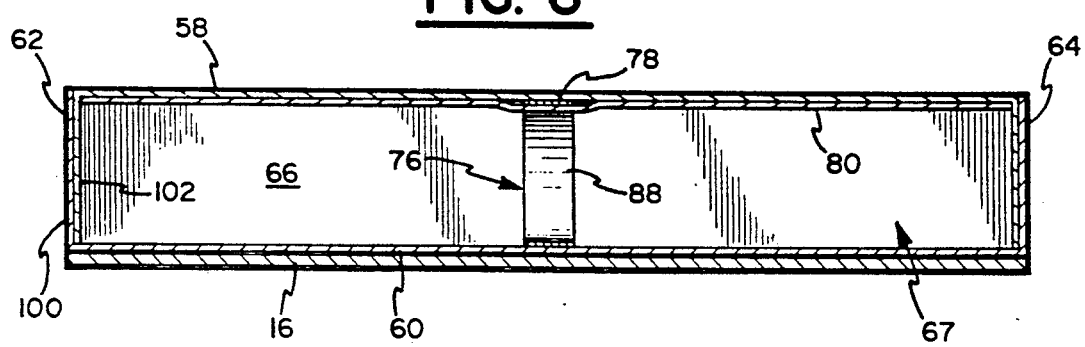

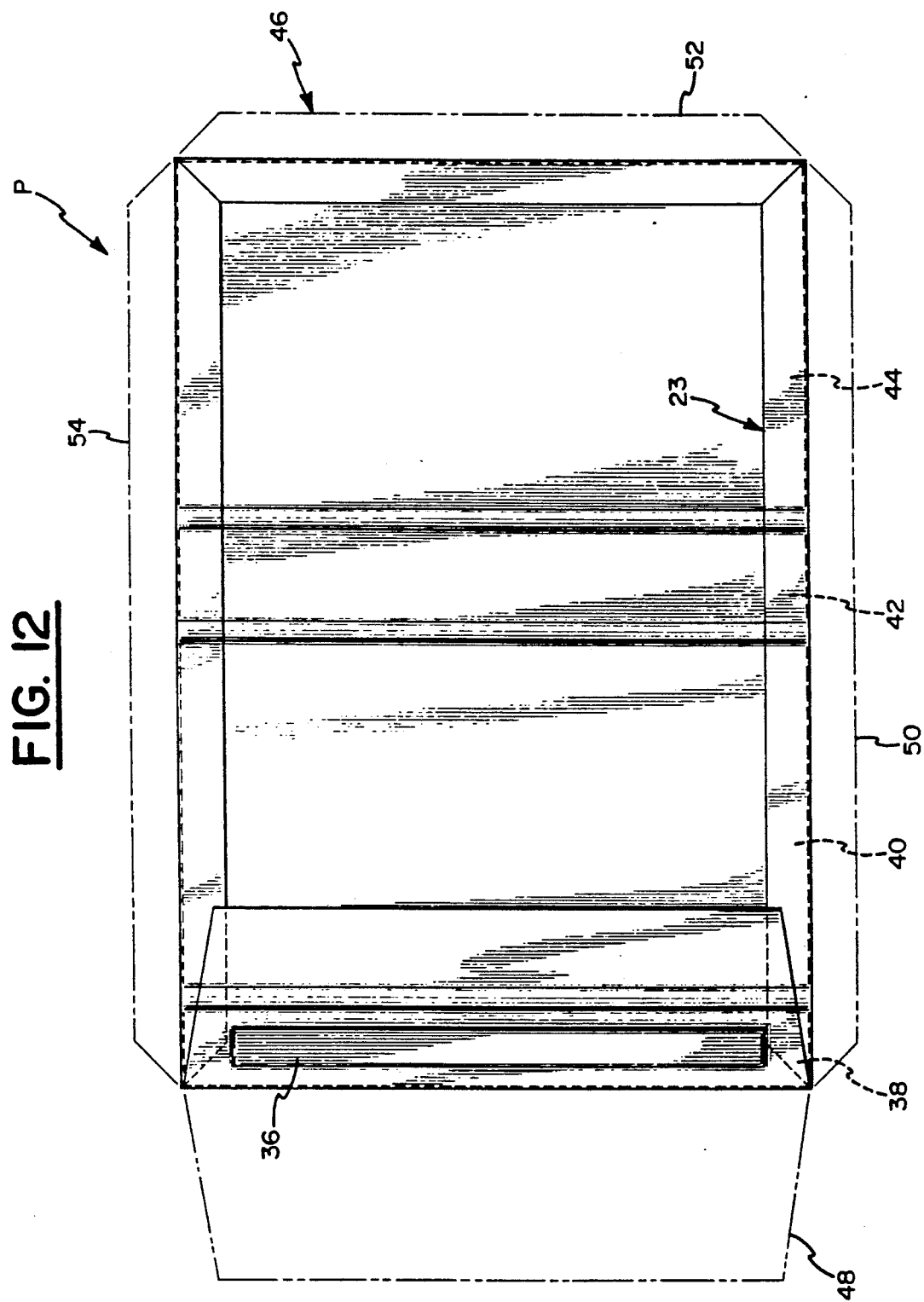

BOOK-LIKE STORAGE CONTAINER FOR A VIDEOCASSETTE OR THE LIKE

FIELD AND HISTORICAL BACKGROUND OF THE INVENTION

The present invention is directed to storage containers, and more particularly to a book-like container for storing, identifying and displaying videocassettes or the like.

The prior art is replete with various types of containers for the storage of audio- or videocassettes. An example of an audio tape container is disclosed by U.S. Pat. No. 3,829,132 to Willieme. This patent discloses a composite cover-support for tape cassettes and printed matter in the form of a book. Single or multiple cassettes and the book lie adjacent to each other in various arrangements. A mechanical snap-on type of a fastener is shown to be provided for completing the assembly.

Another example of an article container is shown in U.S. Pat. No. 4,765,466 to Ivey. This patent discloses a folio made of a card material for receiving an article that includes a sheet folded to form front and rear panels and a spine. The article-receiving receptacle is mounted on the inside of the rear panel and a clasp is received in a cut-out on the rear wall of the receptacle for completing the assembly.

Other examples of containers of this type are disclosed in U.S. Pat. Nos. 873,473; 2,341,600; 4,235,334; 4,407,410; 4,446,920; 4,717,021; 4,724,957; 4,778,051; 4,789,058; and 4,925,027.

There is, however, a need in the art for a container for the storage of audio or video tapes or the like which includes a positive, easy-to-use locking mechanism for securing the tape therein.

OBJECTS AND SUMMARY OF THE INVENTION

The principal object of the present invention is to provide a book-like storage container for audio- or videocassettes or the like that provides a substantially dust-proof environment for securing the tape, and wherein a positive and easy-to-use locking mechanism is provided.

Another object of the present invention is to provide a book-like storage container for audio- or videocassettes or the like which includes an easy to close or open cover panel assembly.

Yet another object of the present invention is to provide a book-like storage container for audio- or videocassettes or the like wherein the receptacle for receiving the article is open towards the spine of the container for thereby effectively securing the article therein in the closed position.

Still yet another object of the present invention is to provide a book-like storage container for audio- or videocassettes or the like which facilitates easy removal of the cassette from the receptacle.

An additional object of the present invention is to provide a book-like storage container for audio- or videocassettes or the like which can be easily opened or closed for storing or gaining access to an already stored article.

Still yet an additional object of the present invention is to provide a book-like, aesthetically improved storage container for audio- or videocassettes.

An additional object of the present invention is to provide a book-like storage container for audio- or videocassettes or the like which has the appearance of a bound book.

In summary, the main object of the present invention is to provide a book-like storage container for audio- or videocassettes which is durable, easy to use in terms of opening and closing, inexpensive to manufacture, and which provides a substantially dust-free atmosphere for the article and safely secures the same in the receptacle.

BRIEF DESCRIPTION OF THE DRAWINGS

The above and other objects, the advantages and novel features of the present invention will become apparent from the following detailed description of the preferred embodiment of the invention illustrated in the accompanying drawings, wherein:

FIG. 4 is a top plan view of the container shown in fully open position;

FIG. 5 is an end elevational view of the container in fully open position showing an article being removed therefrom;

FIG. 6 is an enlarged sectional view taken along line 6—6 of FIG. 4;

FIG. 12 illustrates the making of the cover panel assembly for the container of the invention;

DETAILED DESCRIPTION OF THE INVENTION

Figure 1:
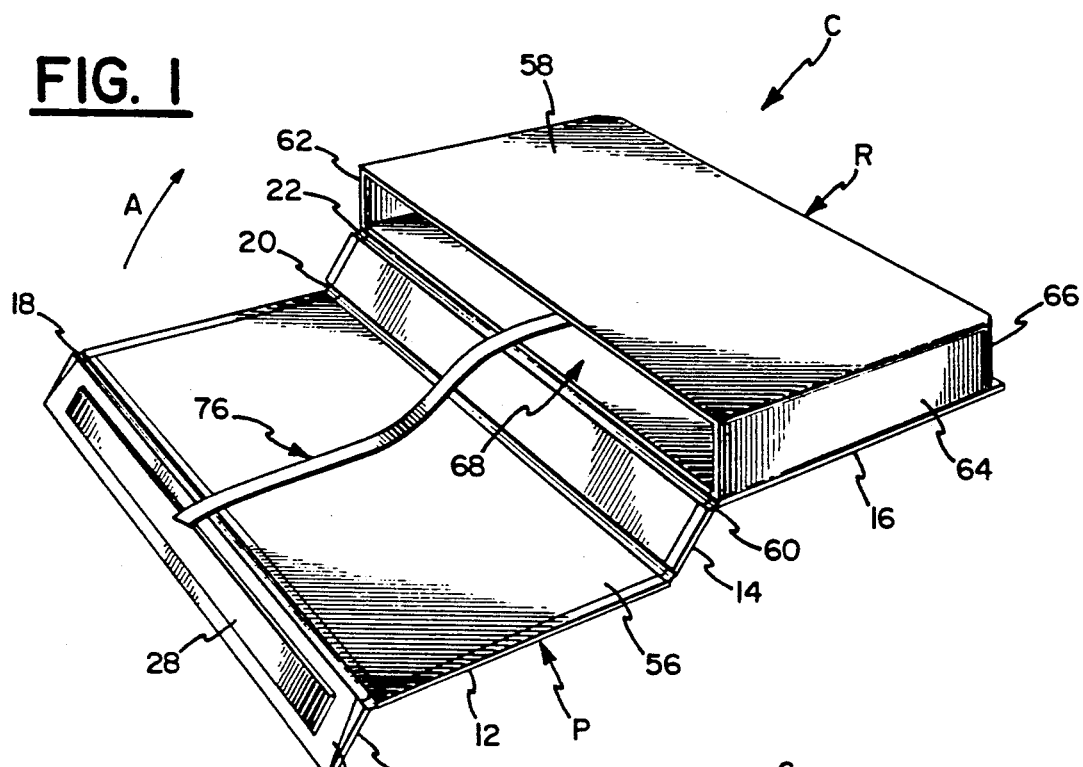
FIG. 1 is a perspective view of the container of the present invention shown in open position.

As best shown in FIGS. 1 and 3–5, container C of the present invention includes receptacle R mounted on panel assembly P. Both receptacle R and panel assembly P are made of a suitable conventional material, such as plastic, cardboard, etc. Although the container C has been shown in the FIGS. 1–15 as being rectangular in configuration for accommodating a conventional videocassette, it should be noted that it is well within the scope of this invention to make container C in various other shapes or configurations for accommodating other articles.

The panel assembly includes flap panel 10, front cover panel 12, spine panel 14, and back panel 16, best shown in FIGS. 1–5 and 12. The flap panel 10 is foldably connected to front cover panel 12 by hinge 18, and cover panel 12 is foldably connected to spine panel 14 by hinge 20. The spine 14 is likewise foldably connected to back panel 16 by hinge 22. The entire panel assembly P is covered by a suitable material 23, such as cloth, paper, leather or the like.

Figure 8:
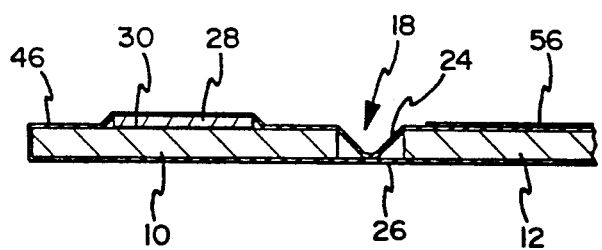
FIG. 8 is a partial, enlarged sectional view taken along line 8—8 of FIG. 4.
Figure 10:
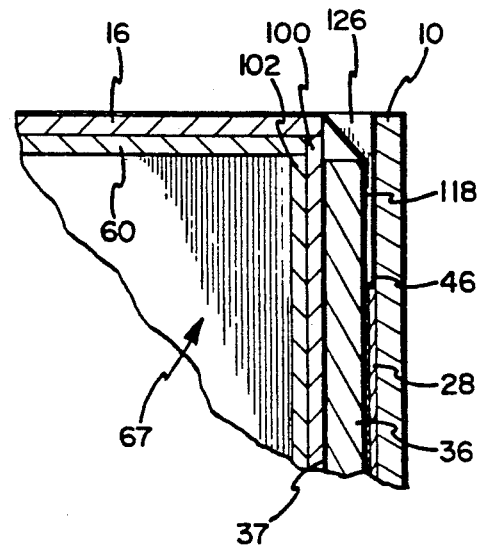
FIG. 10 is a partial, enlarged sectional view taken along line 10—10 of FIG. 7.
Figure 9:
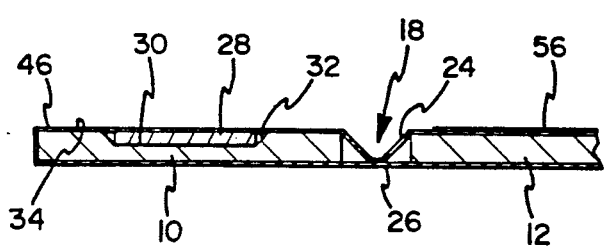
FIG. 9 is a view similar to FIG. 8 showing an alternative embodiment.

As best shown in FIGS. 8 and 9, hinge 18 is generally U-shaped in cross-section and includes upper U-shaped member 24 and backing support 26. Hinges 20 and 22 also have the same configuration as hinge 18. In this manner, when container C is caused to assume a closed position (FIG. 2) from an open position (FIG. 1), the panels 10, 12, and 14 tend to fold inwardly towards receptacle R, shown by arrow A in FIG. 1.

As shown in FIG. 8, a metallic strip 28 is mounted on flap panel 10 by adhesive 30. The strip 28 is preferably one-half inch in width and extends substantially the length of flap panel 10. In an alternative embodiment, shown in FIG. 9, metallic strip 28 is securely mounted in a corresponding recess 32 in flap panel 10. In this type of arrangement, metallic strip 28 is flush with upper surface 34 of flap panel 10. The metallic strip 28, when container C is caused to assume a closed position, comes to engage a cooperating magnetic strip 36 of a suitable width and thickness mounted on receptacle R by adhesive 37, FIGS. 3 and 10 (described below in detail). It should be noted that other interlocking means, such as VELCRO fasteners, may be utilized for closing container C.

As shown in FIG. 12, panel assembly P is made by placing core pieces 38, 40, 42 and 44 in a side-by-side relationship, and a predetermined distance away from each other to form hinges 18, 20 and 22, on a suitable cover material 46. It should be noted that metallic strip 28 would have already been mounted on core piece 38 which in the finished form functions as flap panel 10. The core pieces 40, 42 and 44, in the finished form, function as front cover panel 12, spine panel 14, and back panel 16, respectively. The peripheral portions 48, 50, 52 and 54 are then folded over core pieces 38, 40, 42 and 44 in the conventional manner. It should also be noted that the material 46 would have an adhesive or the like applied on the side facing the core pieces so that when its peripheral portions 48, 50, 52 and 54 are folded over, they would be secured on the core pieces 38, 40, 42 and 44. Another piece 56 of a material similar to material 46 (FIGS. 1 and 3) is then applied over folded portions 48, 50, 52 and 54 for completing panel assembly P.

Figure 3:
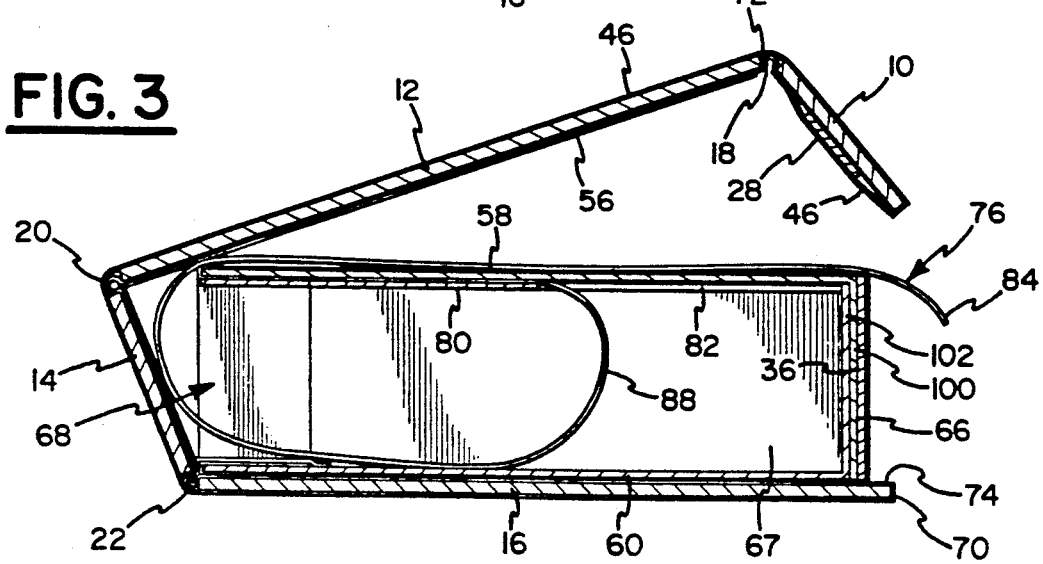
FIG. 3 is a sectional view of the container of FIG. 2 shown in partially open position.
Figure 15:
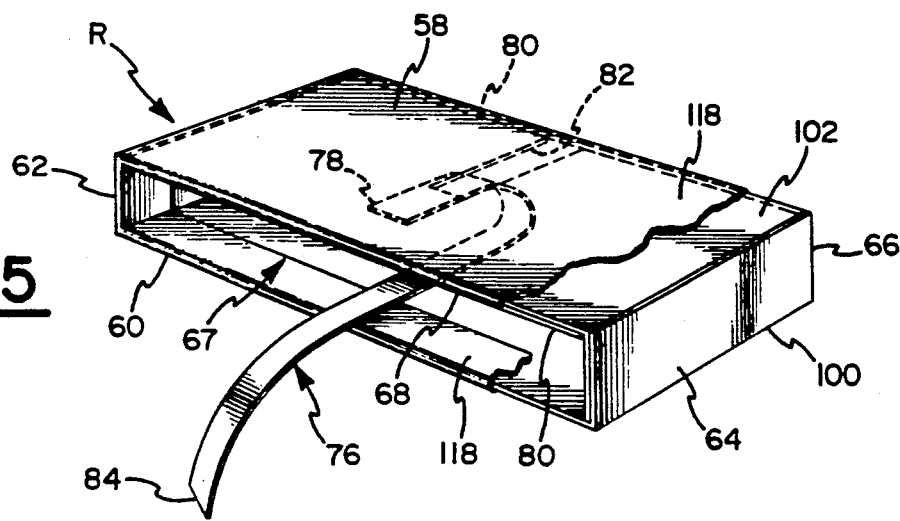

As best shown in FIGS. 1, 3, and 15, the receptacle R includes top wall 58, bottom wall 60, left wall 62, right wall 64, and rear wall 66, which together define a recess 67 for receiving an article. Receptacle opening 68, lying opposite rear wall 66, is adjacent spine 14 and is generally equal in dimension thereto. The top wall 58 corresponds in surface dimension to cover panel 12 and rear wall 66 corresponds in surface dimension to flat panel 10. Therefore, when panel assembly P is folded about hinges 18, 20 and 22, spine panel 14 abuts and substantially closes receptacle opening 68, front cover panel 12 covers top wall 58 and flap panel 10 substantially covers rear wall 66.

Figure 2:
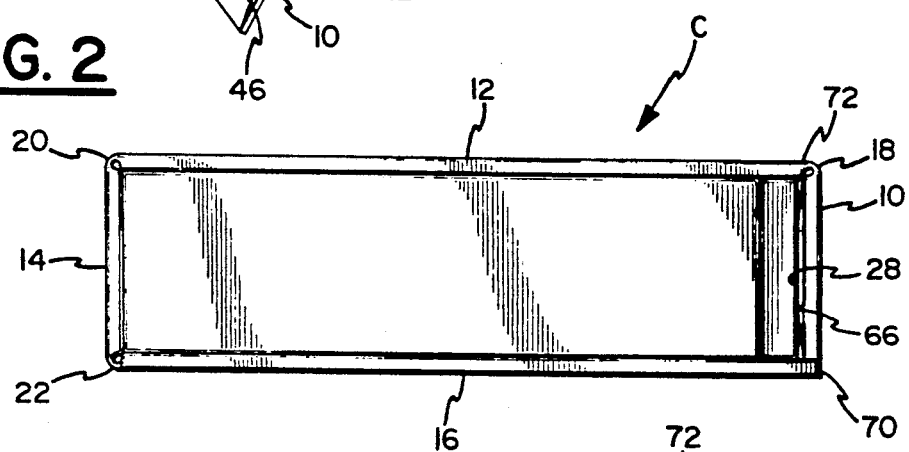
FIG. 2 is an enlarged end elevational view thereof shown in closed position.

As shown in FIG. 2, edge portion 70 of back panel 16 and edge portion 72 of cover panel 12, extend beyond rear wall 66 thereby forming a recess 74 for receiving flap panel 10. The recess 74 is therefore defined by edge portions 70 and 72 and rear wall 66.

As best shown in FIGS. 3, 6 and 15, a pull-tape 76 is secured at its end 78 to the underside of top wall 58 by a reinforcement plate member 80 corresponding in surface dimension to top wall 58. The reinforcement plate 80, best shown in FIG. 15, has a cut-out slot 82 for guiding tape 76. The other end 84 of tape 76 remains free and pull-tape 76 freely suspends from about the center of top wall 58 within the receptacle R. Thus, when a videocassette 86 or the like article is inserted through receptacle opening 68, a portion 88 of tape 76, directly hanging from underside of top wall 58, comes to abut the videocassette 86; and when the free end 84 thereof is pulled outwardly, shown by arrow B in FIG. 5, portion 88 will cause the videocassette 86 to be pulled out through opening 68.

Figure 13:
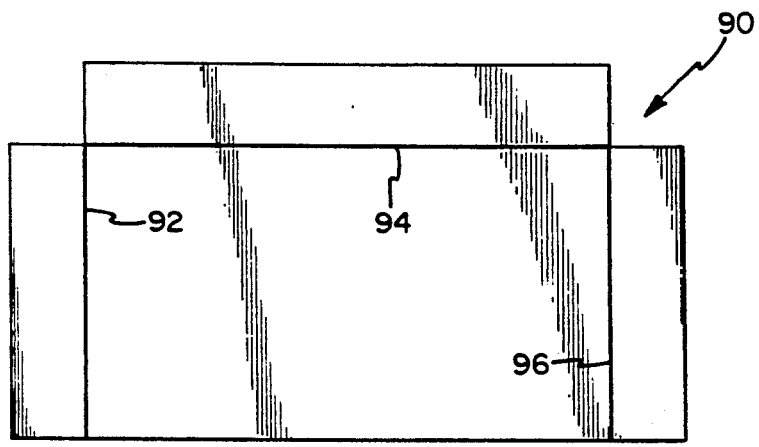
FIG. 13 illustrates the configuration of a starting blank for making the receptacle for the container.
Figure 14:
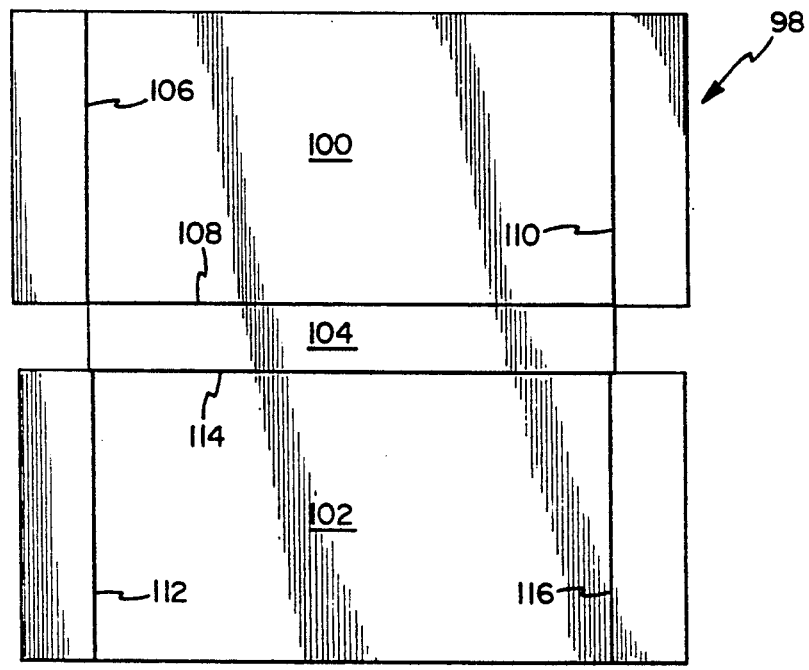
FIG. 14 illustrates the configuration of an alternative starting blank for making the receptacle for the container; and, FIG. 15 is a perspective view of the completed receptacle with a portion broken away to show the completed blanks.

The receptacle R is made of two similar blank pieces such as one designated by reference numeral 90 in FIG. 13. One of the two blank pieces, however, is slightly larger such that when the blank pieces are folded about fold lines 92, 94 and 96 to erect a container-like article, the smaller article is fitted within the larger article. FIG. 14 shows an alternative embodiment wherein a single blank piece 98 includes a larger section 100 connected to slightly smaller section 102 by a median strip 104. The larger section 100 is folded inwardly about fold lines 106, 108 and 110, and likewise smaller section 102 is also folded inwardly about fold lines 112, 114, and 116, to erect the receptacle R, shown in FIG. 15. A covering 118 made of a suitable material, such as cloth, paper, leather, etc., is then applied to finish the receptacle R. Once finished, receptacle R is then mounted by suitable adhesive or the like means on top of core piece 44 (FIG. 12) of panel assembly P, which in the finished form functions as back panel 16.

Figure 7:
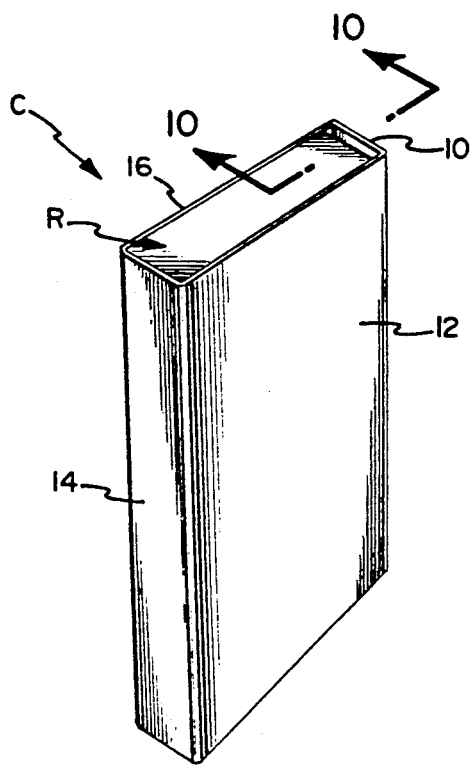
FIG. 7 is a perspective elevational view of the container shown in closed position.
Figure 11:
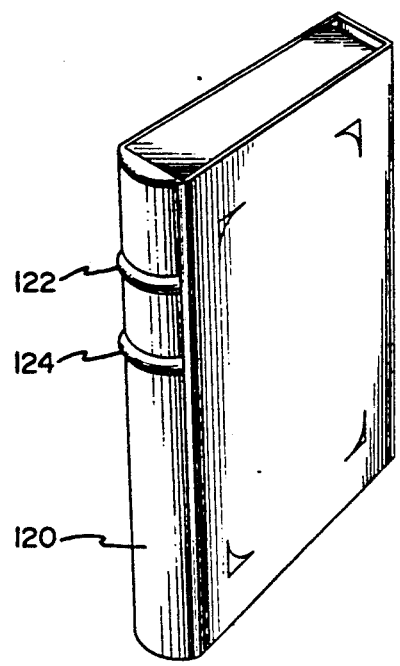
FIG. 11 is a perspective elevational view of an alternate embodiment of the container.

FIG. 11 illustrates an alternative configuration of container C wherein a semi-rounded back section 120 is mounted to the outside of spine panel 14 to give the container C a book-like appearance. (FIG. 7 illustrates container C with a flat spine). Raised bands 122 and 124 on section 120 further enhance the bound, book-like configuration of the container C.

In use, videocassette 86 or the like article is placed in receptacle R through opening 68. The pull-tape 76 is of such a length that its free end 84 remains outside well beyond the receptacle opening 68 after the cassette 86 has been fully inserted. The panel assembly P is then caused to be folded inwardly (see arrow A in FIG. 1) and metallic strip 28 attaches to magnetic strip 36 in a positive manner. When the cassette 86 needs to be removed, the user merely inserts a finger or the like object about rounded corner 126 (FIG. 10) of receptacle R to break the magnetic forces between strips 28 and 36, and panel assembly P is unfolded in a direction opposite to arrow A in FIG. 1 to open container C. In the open position, free-end 84 is then pulled to remove cassette 86 in the manner shown in FIG. 5.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What I claim is:

1. A book-like storage container for articles, comprising:
   (a) receptacle means for removably receiving an article therein;

(b) said receptacle means including top, bottom, left, right, and rear walls;
(c) each of said walls having surface dimensions;
(d) said receptacle means including a front opening;
(e) panel means including first, second and third hinges;
(f) said panel means including first, second and third panels;
(g) said first panel foldably connected to said bottom wall by said first hinge;
(h) said second panel foldably connected to said first panel by said second hinge;
(i) said third panel foldably connected to said second panel by said third hinge;
(j) each of said first, second and third panels having a first open position and a second closed position;
(k) each of said first, second and third panels including inside surface dimensions;
(l) said inside surface dimension of said first panel being substantially equal to said front opening;
(m) said inside surface dimension of said second panel being substantially equal to the surface dimension of said top wall;
(n) said inside surface dimension of said third panel being substantially equal to the surface dimension of said rear wall;
(o) each of said third panel and said rear wall having affixed thereto individual cooperating securement means;
(p) means for removing the article from said receptacle means;
(q) means for mounting said article removing means to said receptacle means;
(r) said article removing means including a string member with first and second ends;
(s) said mounting means including a reinforcement member with a generally U-shaped cut-out slot for guiding a portion of said string member;
(t) said reinforcement member including first and second surfaces;
(u) said top wall including first and second surfaces;
(v) said reinforcement member mounted to said first surface of said top wall; and
(w) said first end of said string member secured between said first surface of said top wall and said first surface of said reinforcement member and said second end remaining free such that said string member suspends freely in said receptacle means;
(x) whereby when said first, second and third panels are folded about said first, second, and third hinges, respectively, for assuming said closed position, said first panel abuts and substantially closes said front opening, said second panel substantially overlies said top wall, and said third panel substantially overlies said rear wall so that said individual securement means thereof are releasably locked for thereby securing the article in said receptacle means.

2. The container of claim 1, wherein:
a) at least one of said first, second and third hinges comprises a generally U-shaped section and a generally planar operably cooperating back section; and
b) said U-shaped section is disposed toward the inside surfaces of said panels.

3. The container of claim 1, wherein:
a) said receptacle means includes at least one rounded corner.

4. The container of claim 1, wherein:
a) said cooperating securement means comprise a pair of generally planar cooperating securement members.

5. The container of claim 4, wherein:
a) said pair of securement members comprises cooperating interlocking mechanical fasteners.

6. The container of claim 4, wherein:
a) said pair of securement members comprises a magnetic strip and a metal strip.

7. The container of claim 6, wherein:
a) said magnetic strip is affixed on said rear wall and said metal strip is affixed on said third panel.

8. The container of claim 6, wherein:
a) said third panel includes a recess substantially equal in dimension to said metal strip; and
b) said metal strip is received in said recess and is flush with the inside surface thereof.

9. The container of claim 1, wherein:
a) each of said receptacle means and said first, second and third panels are made of a cardboard material.

10. The container of claim 1, wherein:
a) said panel means includes a fourth panel having inside surface dimensions and foldably connected to said first panel; and
b) said bottom wall of said receptacle means is affixed to the inside surface of said fourth panel.

11. The container of claim 10, wherein:
a) the inside width dimension of said fourth panel is larger than the width dimension of said bottom wall so that a side edge portion of said fourth panel extends beyond the bottom wall.

12. The container of claim 11, and including:
a) a recess for receiving said third panel in said closed position thereof; and
b) said recess is defined by said side edge portion of said bottom wall, said rear wall, and a portion of said second panel in said closed position thereof.

13. The container of claim 1, and including:
(a) means for covering each of said individual cooperating securement means so as to render them hidden from view.

14. The container of claim 1, wherein:
a) the article includes top, bottom, front and rear ends;
b) said string member has a length sufficient that when the article is inserted through said front opening by the rear end thereof and is substantially received in said receptacle means, a portion of said string member generally cooperatively follows the back end and bottom of the article and said free end thereof remains outside of said receptacle means.

* * * * *